United States Patent [19]

Shea et al.

[11] Patent Number: 4,667,767
[45] Date of Patent: May 26, 1987

[54] FOUR WHEEL DRIVE SYSTEM INCLUDING DISENGAGEMENT MEANS

[75] Inventors: Dennis W. Shea, Toledo; Albert A. Hart, Sylvania, both of Ohio; Loris J. Charchian, Troy, Mich.

[73] Assignee: Dana Corporation, Toledo, Ohio

[21] Appl. No.: 704,655

[22] Filed: Feb. 22, 1985

[51] Int. Cl.$^4$ .................... B60K 17/34; B60K 23/04
[52] U.S. Cl. .................. 180/247; 74/665 GC; 180/248; 192/44; 192/87.1
[58] Field of Search ............... 180/247, 248, 249, 240, 180/233, 250; 192/38, 44, 49, 48.9, 48.8, 87.1; 74/665 GA, 665 GC, 665 GE, 665 T

[56] References Cited

U.S. PATENT DOCUMENTS

| | | | |
|---|---|---|---|
| 1,192,240 | 7/1916 | Staser | 180/6.32 |
| 1,524,875 | 2/1925 | Martinson | 180/245 |
| 3,437,186 | 4/1969 | Roper | 192/38 X |
| 3,941,199 | 3/1976 | Williams | 192/44 X |
| 4,054,065 | 10/1977 | Lemon | 74/711 |
| 4,083,419 | 4/1978 | Fogelberg | 180/233 |
| 4,119,168 | 10/1978 | Fogelberg | 180/248 |
| 4,132,297 | 1/1979 | Brown et al. | 192/36 |
| 4,147,225 | 4/1979 | Mazziotti et al. | 180/247 |
| 4,180,138 | 12/1979 | Shea | 180/65.2 |
| 4,337,840 | 7/1982 | Bufler | 180/233 |
| 4,458,557 | 7/1984 | Hayakawa | 74/665 GE |

FOREIGN PATENT DOCUMENTS 826317 12/1959 United Kingdom .............. 180/247

OTHER PUBLICATIONS

SAE Technical Paper No. 781,061, dated Dec. 11, 1978.
SAE Technical Paper No. 811,284, dated Nov. 9, 1981.

Primary Examiner—John J. Love
Assistant Examiner—Mitchell J. Hill
Attorney, Agent, or Firm—Willian Brinks Olds Hofer Gilson & Lione

[57] ABSTRACT

An improved four wheel drive system for a vehicle is disclosed. The system includes a first carrier assembly connected to a power generation system of the vehicle and adapted to transmit power to a first pair of drive wheels. A second carrier assembly having an input member and an output member connected to a second pair of drive wheels is also provided. The second carrier assembly is adapted to transmit power from the input member to the output member. A mechanism is provided for selectively connecting the first carrier assembly to the input member of the second carrier assembly for transmitting power thereto. A biasing structure is further provided for moving one of the input and output members relative to the other of the input and output members prior to connecting the first carrier assembly to the input member of the second carrier assembly. In a first embodiment, a rack and pinion arrangement is provided to rotate the input member relative to the output member, while a clutch is connected between the first carrier assembly and the input member. A vacuum control circuit and an electrical control circuit sense the movement of the input member and prevent the clutch from connecting the first carrier assembly to the input member until the input member has moved a predetermined amount. In a second embodiment, drive gears and biasing gears are selectively connected to the input member by first and second clutches, respectively. A hydraulic control circuit and an electrical control circuit are provided to prevent the first clutch from connecting the drive gear to the input member prior to the second clutch connecting the biasing gear to the input member.

18 Claims, 11 Drawing Figures

FOUR WHEEL DRIVE SYSTEM INCLUDING DISENGAGEMENT MEANS

BACKGROUND OF THE INVENTION

The present invention relates in general to vehicular drive axle systems and in particular to an improved four wheel drive system including means for disengaging two of the four driven wheels from the power generation system of the vehicle.

Four wheel drive systems for vehicles are becoming increasingly common. Such systems are usually provided with a primary pair of driving wheels, which are constantly engaged with the power generation system of the vehicle, and a secondary pair of driving wheels, which are typically only engaged to the power generation system of the vehicle at selected times. When so engaged, each of the four wheels is capable of driving the vehicle across a surface upon which the vehicle is to be operated. The primary pair of driving wheels can be either the front or rear wheels, depending upon the particular design of the vehicle. In either event, some mechanism is provided for selectively connecting and disconnecting the secondary pair of driving wheels from the power generation system so as to permit the vehicle to be operated in either the four wheel drive or two wheel drive mode.

In most four wheeled vehicles, the steering system is designed such that the turning radii of all four wheels converge at a single point. Since the four wheels are spaced apart from one another, their turning radii are all different. When the vehicle is proceeding through a turn, a different distance is traveled by each wheel in the same period of time and, consequently all four wheels rotate at different speeds. Thus, the inside wheels cut in more tightly than their respective outside wheels, and the rear wheels turn more sharply than the front wheels. The relatively slower speed of an inside wheel with respect to the relatively faster speed of its respective outside wheel is typically compensated for by a conventional intra-axle differential assembly or an overrunning clutch assembly on the axle, which permits the outside wheel to rotate faster than the inside wheel. In conventional four wheel drive systems, an inter-axle differential assembly can be provided to compensate for the variation between the relatively fast speed of the front axle and the relatively slow speed of the rear axle. The input to the inter-axle differential assembly is connected to the power generation system of the vehicle, while the outputs therefrom are connected to the front and rear axles. The inter-axle differential assembly suffers from the same problem as the intra-axle differential assembly, namely, that no power will be transmitted to one of the outputs if the other of the outputs rotates freely, such as when one wheel loses traction on a slippery surface. Furthermore, because the front and rear axles are driven at a constant speed relative to one another by the power generation system of the vehicle, undesirable wear can occur on the tires of the wheels or, more seriously, torsional forces may be created between the front and rear axles when the vehicle is turned on a non-slippery surface. Thus, as mentioned above, conventional four wheel drive systems include some means for disconnecting the secondary pair of drive wheels from the power generation system of the vehicle to prevent this from occurring.

SUMMARY OF THE INVENTION

The present invention relates to an improved four wheel drive system including means for disconnecting two of the driven wheels from the power generation system of the vehicle. A first embodiment of the invention includes a first drive shaft for connecting the power generation system of the vehicle to a first carrier assembly. The first carrier assembly is adapted to transmit power from the first drive shaft to the primary pair of driving wheels of the vehicle. The first carrier assembly can include a differential gear to compensate for the difference between the speeds of the inside and outside primary drive wheels when the vehicle is proceeding through a turn. A second drive shaft is connected between the first carrier assembly and a second carrier assembly. A clutch is provided for selectively connecting and disconnecting the second drive shaft to the power generation system of the vehicle. The second carrier assembly is adapted to transmit power from the second drive shaft to the secondary pair of driving wheels of the vehicle. The second carrier assembly can include a pair of bi-directional overrunning clutches to compensate for the difference between the speeds of the inside and outside secondary drive wheels when the vehicle is proceeding through a turn. The second carrier assembly further includes biasing means for initially rotating the secondary drive axles by a predetermined amount such that the bi-directional overrunning clutches are moved to a released position prior to being moved to an engaged position for four wheel drive operation. Such initial rotation prevents the bi-directional clutches thereon from locking up because of a change in the direction in which the vehicle is operated.

A second embodiment of the invention includes a first drive shaft for connecting the power generation system of the vehicle to a first carrier assembly The first carrier assembly is adapted to transmit power from the first drive shaft through a differential gear to the primary pair of driving wheels of the vehicle. The first carrier assembly can include a rotatable input shaft having a driving gear and a biasing gear splined thereon for rotation therewith. The first carrier assembly can further include a rotatable output shaft having a corresponding drive gear and biasing gear mounted thereabout. The output shaft drive gear and the output shaft biasing gear are continuously engaged with the input shaft drive gear and the input shaft biasing gear, respectively, but are free to rotate relative to the output shaft. First and second clutch means are provided to selectively connect the output shaft drive gear and the output shaft biasing gear, respectively, to the output shaft for rotation therewith. The output shaft is connected through a second drive shaft to a second carrier assembly. The second carrier assembly is adapted to transmit power from the second drive shaft to the secondary pair of driving wheels of the vehicle. The second carrier assembly can include a pair of bi-directional overrunning clutches. A biasing means is provided for initially actuating the second clutch so as to connect the output shaft biasing gear to the output shaft such that the bi-directional overrunning clutches are moved to a released position. Once this has occurred, the biasing means de-actuates the second clutch and actuates the first clutch so as to connect the output shaft drive gear to the output shaft for four wheel operation.

It is an object of the present invention to provide a novel four wheel drive system including means for disconnecting two of the driven wheels from the power generation system of the vehicle.

It is another object of the present invention to provide such a four wheel drive system which automatically biases the secondary drive axles such that respective bi-directional overrunning clutches thereon are moved to a released position before engaging such drive axles for four wheel drive operation.

It is a further object of the present invention to provide such a biasing means which is operative when the vehicle is moved in either forward-to-reverse or reverse-to-forward directions.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENTS

Figure 1:
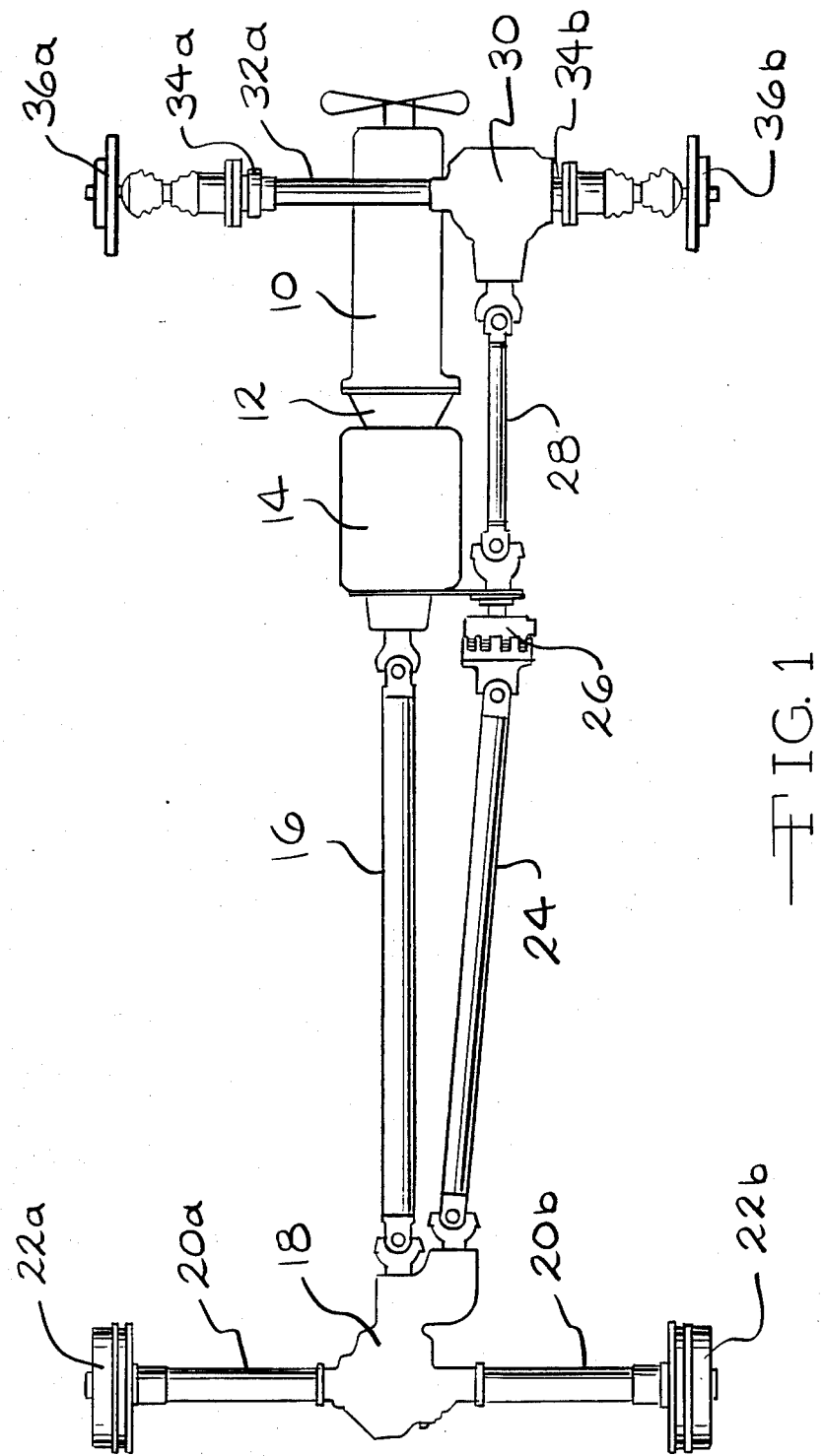
FIG. 1 is a schematic top plan view of a first embodiment of a four wheel drive system for a vehicle in accordance with the present invention.

Referring now to the drawings, there is illustrated a four wheel drive system for a vehicle in accordance with the present invention. As utilized herein, the term "primary" will refer to those drive wheels and associated components which are constantly connected to the power generation system of the vehicle. The term "secondary" will refer to those drive wheels and associated components which are only selectively connected to the power generation system of the vehicle. Although the present invention will be described and illustrated as though the rear wheels of the vehicle constitute the primary drive wheels and the front wheels of the vehicle constitute the secondary drive wheels, it will be appreciated that the opposite situation (i.e., primary drive wheels in the front and secondary drive wheels in the rear) is contemplated to be within the scope of the present invention.

FIGS. 1 through 7 schematically illustrate a first embodiment of the four wheel drive system for a vehicle in accordance with the present invention. An engine 10 of the vehicle is connected through a clutch 12 and a transmission 14 to one end of a first drive shaft 16. The engine 10, clutch 12, and transmission 14 comprise the power generation system of the vehicle. The other end of the first drive shaft 16 is connected to a first carrier assembly 18 for transmitting power from the engine to a pair of rear primary drive axles 20a and 20b. Respective primary drive wheels 22a and 22b are connected for rotation with the rear drive axles 20a and 20b. The first carrier assembly 18 can include a conventional differential gear assembly (not shown) for transmitting power from the first drive shaft 16 to the rear drive axles 20a and 20b, while permitting the primary drive wheels 22a and 22b to rotate at different speeds when the vehicle is proceeding through a turn. The first carrier assembly 18 can further include a pair of conventional transfer gears (not shown) for continuously connecting the other end of the first drive shaft 16 to one end of a second drive shaft 24 for rotation therewith.

The second drive shaft 24 is connected at its other end to the input of a clutch device 26. The clutch device 26 can comprise any conventional clutch mechanism which is ; adapted to be engaged and disengaged while a load is placed thereon between the input and output members. A common friction clutch has been found to operate satisfactorily as the clutch device 26. The output of the clutch device 26 is connected through a second drive shaft extension 28 to a second carrier assembly 30. The structure and operation of the second carrier assembly 30 will be explained and illustrated in greater detail below. However, the second carrier assembly 30 is adapted to transmit power from the second drive shaft extension 28 to a pair of front secondary drive axles 32a and 32b. Respective bi-directional overrunning clutches 34a and 34b are connected to the front drive axles 32a and 32b. The bi-directional overrunning clutches 34a and 34b are conventional in the art and permit the output members thereof, connected to the secondary drive wheels 36a and 36b, to rotate faster than their respective input members, connected to the secondary drive axles 32a and 32b. Such a condition would occur when the vehicle is proceeding through a turn. The structure of one of the bi-directional overrunning clutches 34b is illustrated in detail in FIG. 4.

Figure 2:
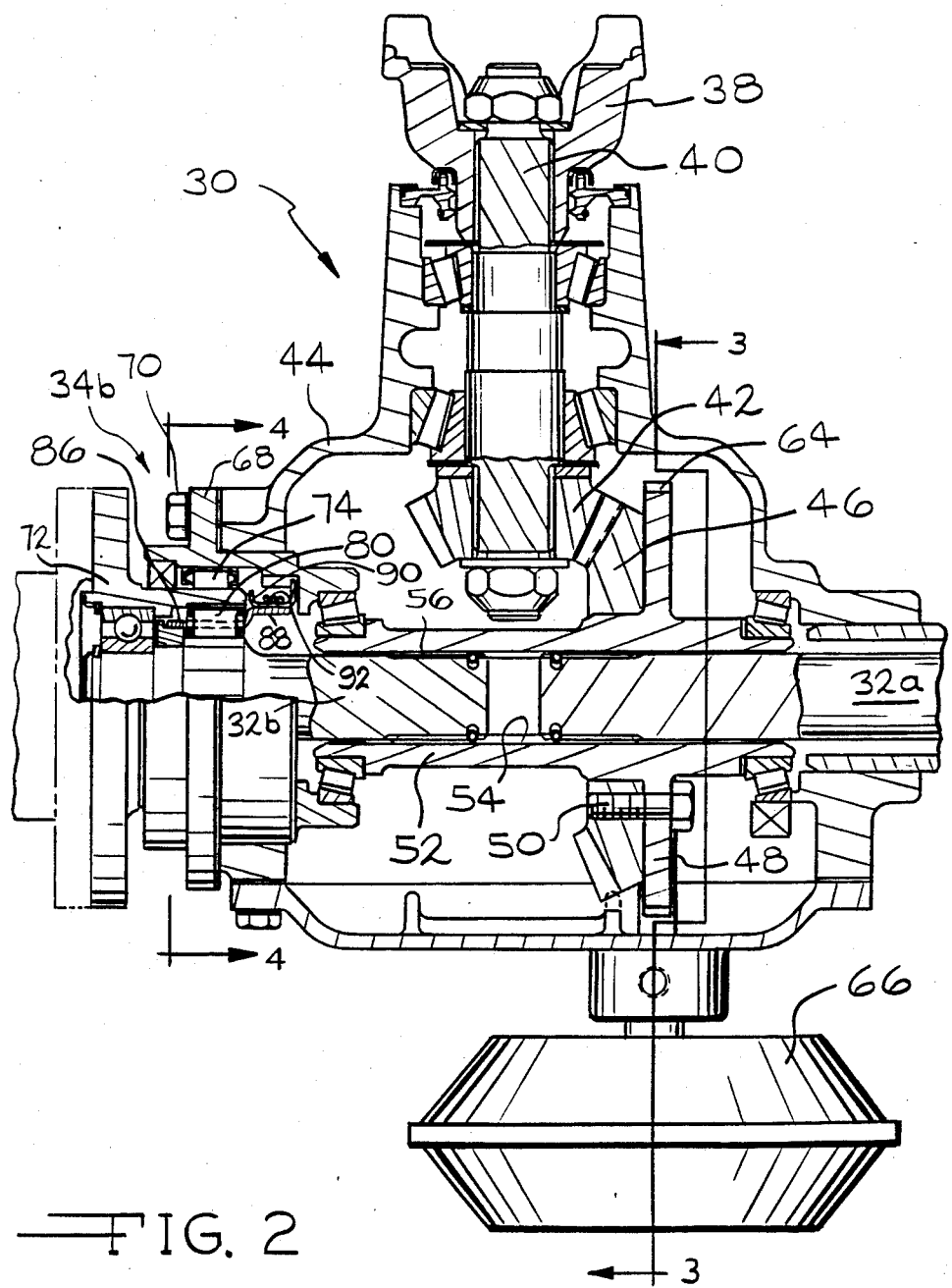
FIG. 2 is an enlarged top plan view, partially in section, of the second carrier assembly illustrated in FIG. 1.
Figure 3:
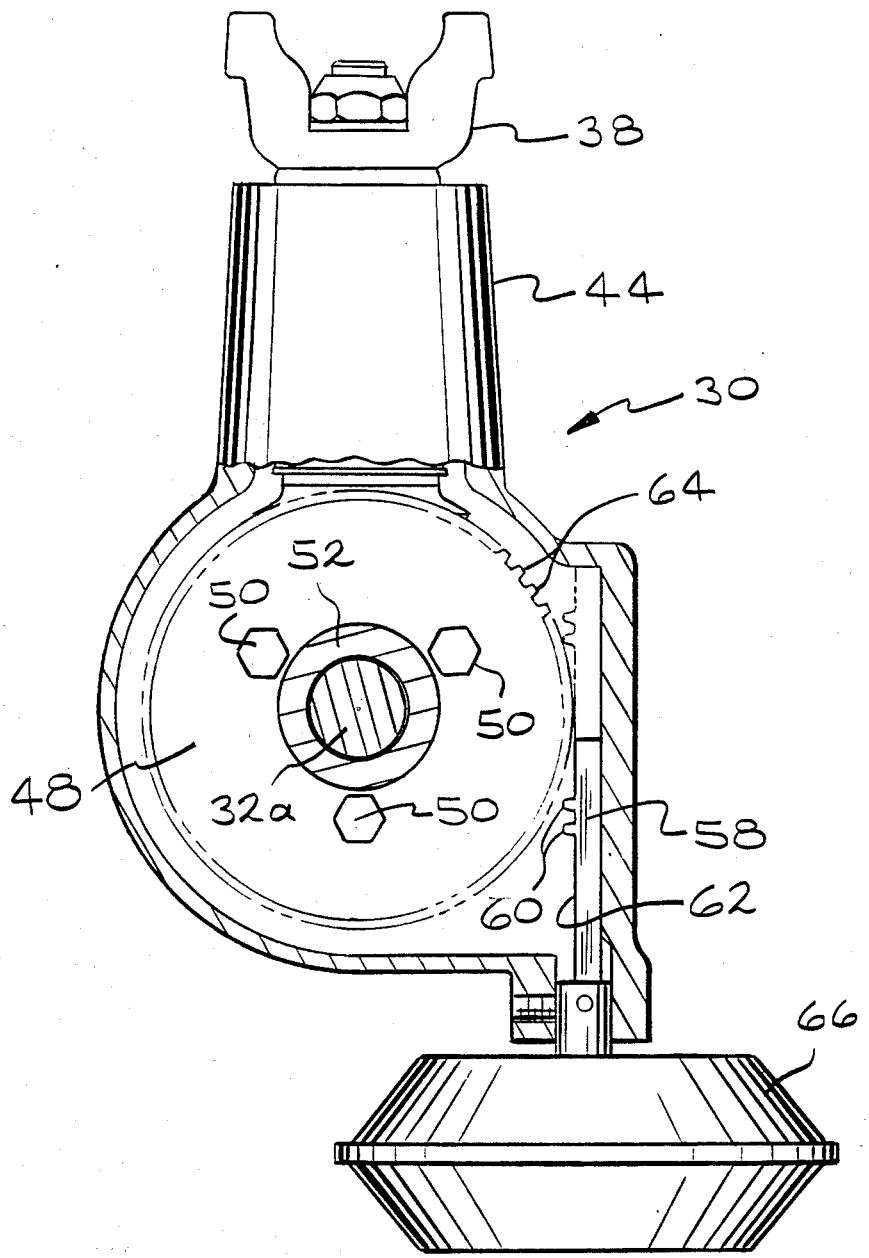
FIG. 3 is a sectional view, partially broken away, of the second carrier assembly taken along line 3—3 of FIG. 2.

Referring now to FIGS. 2 and 3, the structure and operation of the second carrier assembly 30 are illustrated in detail. A yoke 38 is adapted to be connected in a known manner to the second drive shaft extension 28 for rotation therewith. The yoke 38 is attached to a rotatable cylindrical member 40 which terminates in a drive pinion 42 within a housing 44 of the second carrier assembly 30. The drive pinion 42 cooperates with a rotatable ring gear 46. The ring gear 46 is attached to a biasing gear 48 by a plurality of threaded fasteners 50 or any other suitable means. The biasing gear 48 can be formed as a radially-extending portion of a hollow cylindrical spool 52 having a plurality of internal splines 54 formed therein. The inner ends of the front drive axles 32a and 32b have corresponding pluralities of external splines 56 formed thereon adapted to engage the internal splines 54 formed on the spool 52. Accordingly, rotation of the ring gear 46 by the drive pinion 42 causes rotation of the front drive axles 32a and 32b.

A biasing means is provided to initially rotate the biasing gear 48 and the front drive axles 32a and 32b by a predetermined amount prior to engaging the clutch device 26 for four wheel drive operation. The need for such initial biasing will be explained in detail below.

The biasing means includes a rack 58 which is linearly moveable in two directions. The rack 58 includes a number of teeth 60 formed on one flat surface 62 thereof. The teeth 60 are adapted to selectively engage a plurality of teeth 64 formed about the periphery of the biasing gear 48. A means is provided for moving the rack 58 in either of the two directions. In the illustrated embodiment, such means consists of a vacuum-operated rack actuator 66. The rack actuator 66 includes an enclosed moveable piston (not shown) connected to the rack 58. The piston is responsive to the application and withdrawal of vacuum on either side thereof to cause movement of the rack 58. For example, the rack actuator 66 can include two inlets (not shown) communicating with interal chambers disposed on the opposed sides of the piston. When a vacuum is created in one of the inlets and the other inlet is vented to the atmosphere, the rack 58 will be moved in one direction. When these connections to the inlets are reversed, the rack 58 will be moved in the other direction.

As illustrated in FIG. 3, the rack 58 is adapted to be moved from a first position (illustrated in solid lines) to a second position (illustrated in dotted lines). When the rack 58 is in either the first or second position, the teeth 60 thereof are not engaged with the teeth 64 of the biasing gear 48. In these two positions, therefore, the biasing gear 48, as well as the spool 52 and front drive axles 32a and 32b, are free to rotate. However, during the travel of the rack 58 from the first position to the second position (or vice versa), the teeth 60 will engage the teeth 64 of the biasing gear 48 and cause the biasing gear 48, the spool 52, and the front drive axles 32a and 32b to rotate by a predetermined amount in the appropriate direction until the teeth 60 of the rack 58 have moved past the biasing gear 48 into the other position. The amount of rotation of the biasing gear 48 can be varied, depending upon the number of teeth 60 formed on the rack 58 and the size of the biasing gear 48. Thus, when a vacuum is created in one of the inlets to the rack actuator 66, the rack 58 will be moved, as described above, and the front drive axles 32a and 32b will be rotated by a predetermined amount in one direction. When a vacuum is created in the other of the inlets, the front drive axles 32a and 32b will be rotated by a predetermined amount in the other direction.

Figures 4, 5:
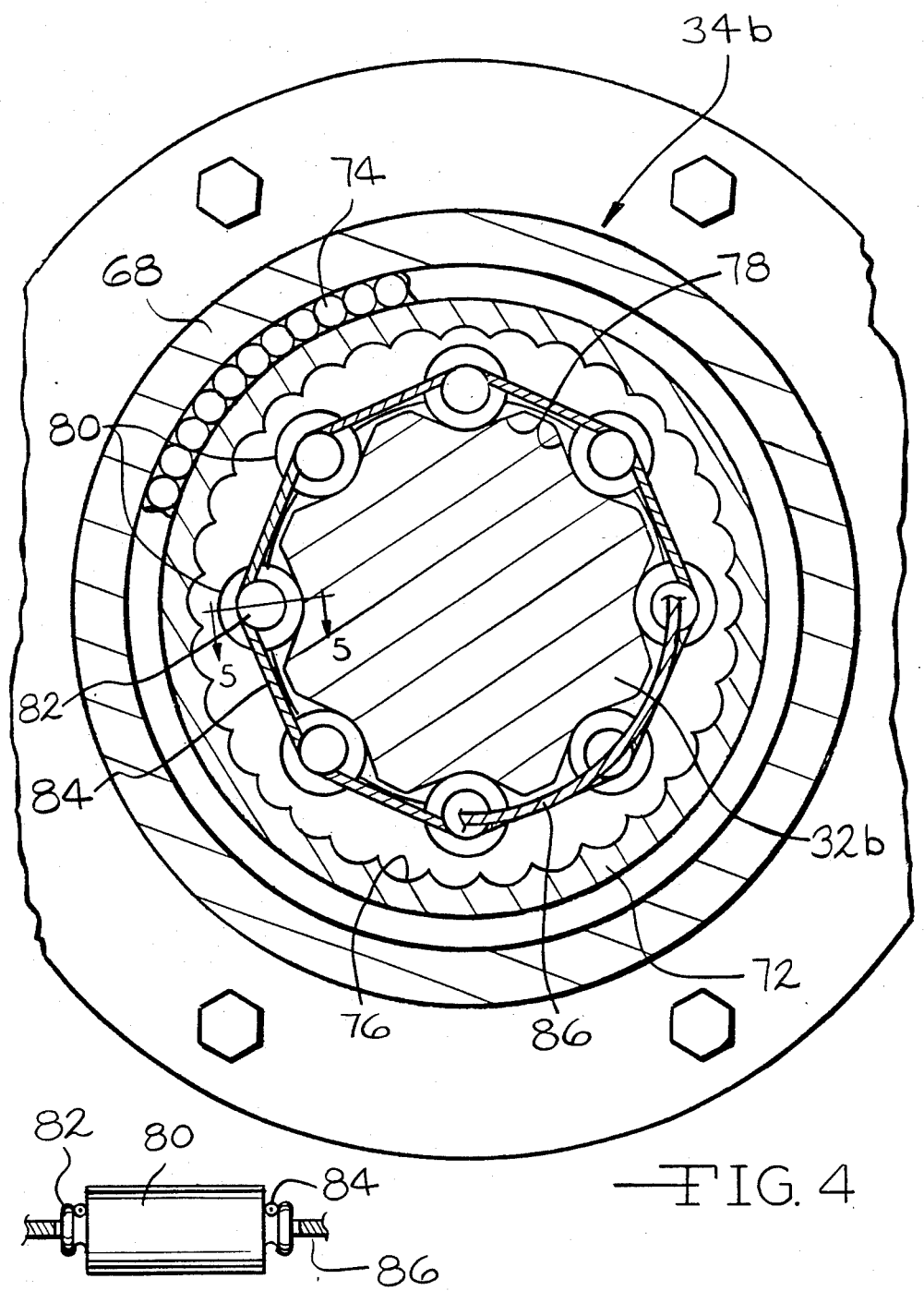
FIG. 4 is a sectional view of one of the bi-directional overrunning clutches taken along line 4—4 of FIG. 2.
FIG. 5 is a sectional view of the roller 80, roller cage 86, and springs 84 taken along line 5—5 of FIG. 4.

The bi-directional overrunning clutches 34a and 34b are respectively connected between the front drive axles 32a and 32b and their respective primary drive wheels 36a and 36b. The clutches 34a and 34b are conventional in the art and form no part of the present invention. However, in order to more fully understand the purpose of the present invention, one of the bi-directional overrunning clutches 34b is illustrated in FIGS. 4 and 5. The clutch 34b is enclosed by a hollow cylindrical housing 68 which is attached to the second carrier housing 44 by a plurality of fasteners 70 or any other means. A hollow cylindrical output member 72 is disposed co-axially within the housing 68. A plurality of roller bearings 74 are maintained between the inner surface of the housing 68 and the outer surface of the output member 72 so as to permit rotation of the output member 72 relative to the housing 68. The inner surface of the output member 72 is formed with a plurality of inwardly-extending concave portions 76 about the circumference thereof.

The front drive axle 32b is the input member to the bi-directional overrunning clutch 34b. The front drive axle 32b is disposed co-axially within the output member 72. The outer surface of the front drive axle 32b is provided with a plurality of outwardly-extending ramp portions 78 about the periphery thereof. A cylindrical roller 80 is disposed between each of the adjacent ramp portions 78. Each roller 80 includes a relatively small diameter end portion 82 extending axially outwardly from both ends thereof. A spring 84 or other resilient member extends about each of the end portions 82 on each side of the rollers 80 to normally maintain the rollers 80 centered between the ramp portions 78 and against the front drive axle 32b. In this position, the rollers 80 are kept out of contact with the output member 72. A generally cylindrical roller cage 86 is provided about the periphery of the front drive axle 32b. Each of the rollers 80 is contained at either end by the roller cage 86. The roller cage 86 plurality of brake shoes 90 are disposed about the periphery of the roller cage flange 88. The brake shoes 90 are attached at their inner ends to the cylindrical housing 68 of the clutch 34b. The outer ends of the brake shoes 90 are urged into frictional contact with the flange 88 by a plurality of drag springs 92 disposed co-axially thereabout.

In operation, the front drive axle 32b is initially rotated in a desired direction by the power generation system of the vehicle when it is engaged by the clutch device 26. When this occurs, the rollers 80, the springs 84, and the roller cage 86 all rotate with the front drive axle 32b as a unit, together in the same direction. However, as described above, the brake shoes 90. frictionally engage the roller cage flange 88, thereby tending to resist such rotation. This drag effect causes each of the rollers 80 to roll up one of the adjacent ramp portions 78 and, consequently, to move outwardly away from the rotating front drive axle 32b. After the rollers 80 have moved outwardly by a predetermined distance, they each engage the sides of the inwardly-extending concave portions 76 formed in the inner surface of the output member 72. When this occurs, the rollers 80 will become locked between the front drive axle 32b and the output member 76, causing the entire unit to rotate as a single unit. Thus, the front drive axle 32b is connected to the output member 76 and the corresponding secondary drive wheel 36b for rotation in the desired direction.

If the secondary drive wheel 36b should happen to be rotated in the same direction as the front drive axle 32b, but at a speed which is faster than the speed at which the front drive axle 32b is driven by the power generation system of the vehicle (such as occurs if the secondary drive wheel 36b is the outside wheel when the vehicle is proceeding through a turn), the output member 72 will rotate in that direction relative to the front drive axle 34b so as to release the rollers 80 previously locked therebetween. The rollers 80 will then return to their normal released position against the front drive axle 32b under the urging of the springs 84 and out of contact with the output member 72. Consequently, the output member 72 will be released from the front drive axle 32b. Thus, the clutch 34b is an "overrunning" clutch, because the input member 32b is released from the output member 72 when the speed of the output member 72 exceeds the speed of the input member 32b. Because of the symmetry of the structure of the clutch 34b, it can be seen that the clutch 34 operates similarly in both the forward and reverse directions and is therefore "bi-directional".

The secondary drive axles 32a and 32b are typically driven at a somewhat slower speed than the speed at which the primary drive axles 20a and 20b are driven, by virtue of an appropriate ratio between the transfer gears of the first carrier assembly 18 or by other means. As a result, the secondary drive axles wheels 36a and 36b are constantly "overrunning" (i.e., rotating faster than the speed at which they are driven) by virtue of the clutches 34a and 34b when the vehicle is operated in the four wheel drive mode on a non-slippery surface. Such overrunning is desirable because it maintains the vehicle in an essentially two wheel drive mode (even though engaged for four wheel drive operation) until the primary drive axles 20a and 20b rotate, faster than the speed at which the secondary drive wheels 36a and 36b are driven. This can arise when either of the primary drive wheels 22a and 22b lose traction on a slippery surface. The above-described overrunning gear ratio arrangement is desirable because it prevents unnecessary tire wear and allows for tire pressure differences when the vehicle is operated on a non-slippery surface.

Because of this overrunning gear ratio arrangement, however, a lock-up problem can occur with the bi-directional overrunning clutches 34a and 34b when the direction in which the vehicle is operated is changed while the clutches 34a and 34b are engaged. For example, assume that the vehicle has been operated in the forward direction and the bi-directional clutches 34a and 34b are engaged to drive the secondary pair of drive wheels 36a and 36b. When the clutch 34 is engaged, as discussed above, the rollers 80 will be locked between the ramp portions 78 of the front drive axle 32b and the concave portions 76 of the output member 72 for forward rotation. The rollers 80 will remain in this locked position until the output member 72 is rotated in the forward direction relative to the front drive axle 32b or until the front drive axle 32b is rotated in the rearward direction relative to the output member 72 (i.e., until the output member 72 "overruns" the front drive axle 32b). Merely disconnecting the front drive axles 32a and 32b from the power generation system of the vehicle, such as by means of the clutch device 26, will not cause the rollers 80 to be released because of friction between the various elements of the secondary carrier assembly 30. If the vehicle is attempted to be be moved in the reverse direction while the clutches 32a and 32b are locked in position for forward movement, the secondary drive wheels 36a and 36b will be prevented from rotating in the reverse direction. Thus, the vehicle will be immobilized until the vehicle is again operated in the forward direction or until the output member 72 and the front drive axles 32a and 32b are rotated relative to one another as described above.

The biasing means of the present invention is designed to prevent the above-described lock-up condition of the bi-direction overrunning clutches 34a and 34b. In order to accomplish this, means are provided for preventing the clutch device 26 from engaging the second drive shaft extension 28 (and, hence, the secondary drive axles 32a and 32b) for four wheel drive operation until the biasing means rotates the front drive axles 32a and 32b relative to their respective output members 72 such that the bi-directional clutches 34a and 34b thereon are moved to a released position, wherein the rollers 80 of the bi-directional overrunning clutches 34a and 34b are moved out of engagement with the output members 72. In the illustrated embodiment, the biasing means includes a vacuum actuating system for the rack actuator 66 and an electrical control system for controlling the operation thereof. The electrical control system is provided to energize the vacuum control system so as to rotate the front drive axles 32a and 32b in the appropriate directions and to prevent the clutch device 26 from engaging until such rotation has occurred.

Figure 6:
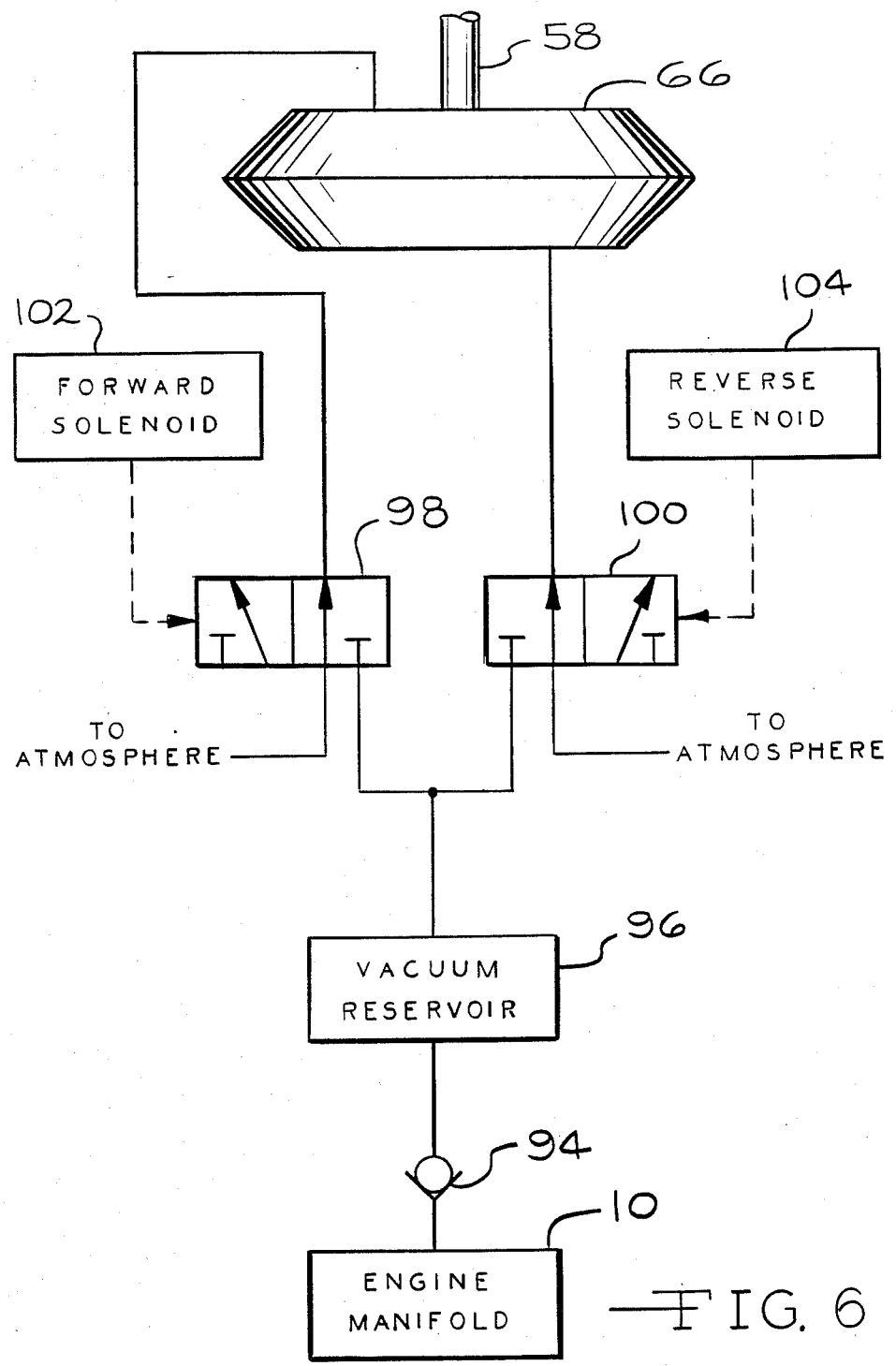
FIG. 6 is a schematic diagram of the vacuum control system of the biasing means illustrated in FIGS. 2 and 3.

Referring now to FIG. 6, the vacuum actuating system of the biasing means of the present invention is illustrated. The manifold of the vehicle engine 10 can be utilized as a source of vacuum for the system. The engine manifold 10 can be connected through a one-way check valve 94 to a vacuum reservoir or canister 96. The vacuum reservoir 96 is connected to a two-position forward vacuum valve 98 and a two-position reverse vacuum valve 100. A forward solenoid 102 is provided for actuating the forward vacuum valve 98 from the first position illustrated in FIG. 6 to a second position (toward the right when viewing FIG. 6). When the forward vacuum valve 98 is in the first position, the vacuum reservoir 96 is sealed off, and the one side of the rack actuator 66 is vented to atmosphere. When the forward vacuum valve 98 is in the second position, the vacuum reservoir 96 communicates with the one side of the rack actuator 66, and the atmosphere is sealed off. Similarly, a reverse solenoid 104 is provided to actuate the reverse vacuum valve 100 from the first position illustrated in FIG. 6 to a second position (toward the left when viewing FIG. 6). When the reverse vacuum valve 100 is in the first position, the vacuum reservoir 96 is sealed off, and the other side of the rack actuator 66 is vented to atmosphere. When the reverse vacuum valve 100 is in the second position, the vacuum reservoir 96 communicates with the other side of the rack actuator 66, and the atmosphere is sealed off.

In operation, the forward solenoid 102 is energized and the reverse solenoid 104 is de-energized when it is desired to bias the front axles 32a and 32b such that the vehicle can be moved in a forward direction. Energization of the forward solenoid 102 causes the forward vacuum valve 98 to be moved to its second position, thereby creating a vacuum in the inlet to one side of the rack actuator 66. De-energization of the reverse solenoid 104 causes the reverse vacuum valve 100 to be moved to its first position, thereby venting the other side of the rack actuator 66 to the atmosphere. The rack 58 will be moved from its first position to its second position in response thereto, and the front drive axles 32a and 32b will be rotated in the reverse direction (relative to the output members 72) as described above. Similarly, the reverse solenoid 104 will be energized and the forward solenoid 102 will be de-energized when it is desired to bias the front drive axles 32a and 32b such that the vehicle can be moved in a reverse direction. Energization of the reverse solenoid 104 causes the reverse vacuum valve 100 to be moved to its second position, thereby creating a vacuum in the inlet to the other side of the rack actuator 66. De-energization of the forward solenoid 102 causes the forward vacuum valve 98 to be moved to its first position, thereby venting the one side of the rack actuator 66 to the atmosphere. The rack 58 will be moved from its second position to its first position in response thereto and the front drive axles 32a and 32b will be rotated in the forward direction (relative to the output members 72). Thus, the rollers 80 of the bi-directional clutches 34a and 34b will be moved to their released positions, as described above.

Figure 7:
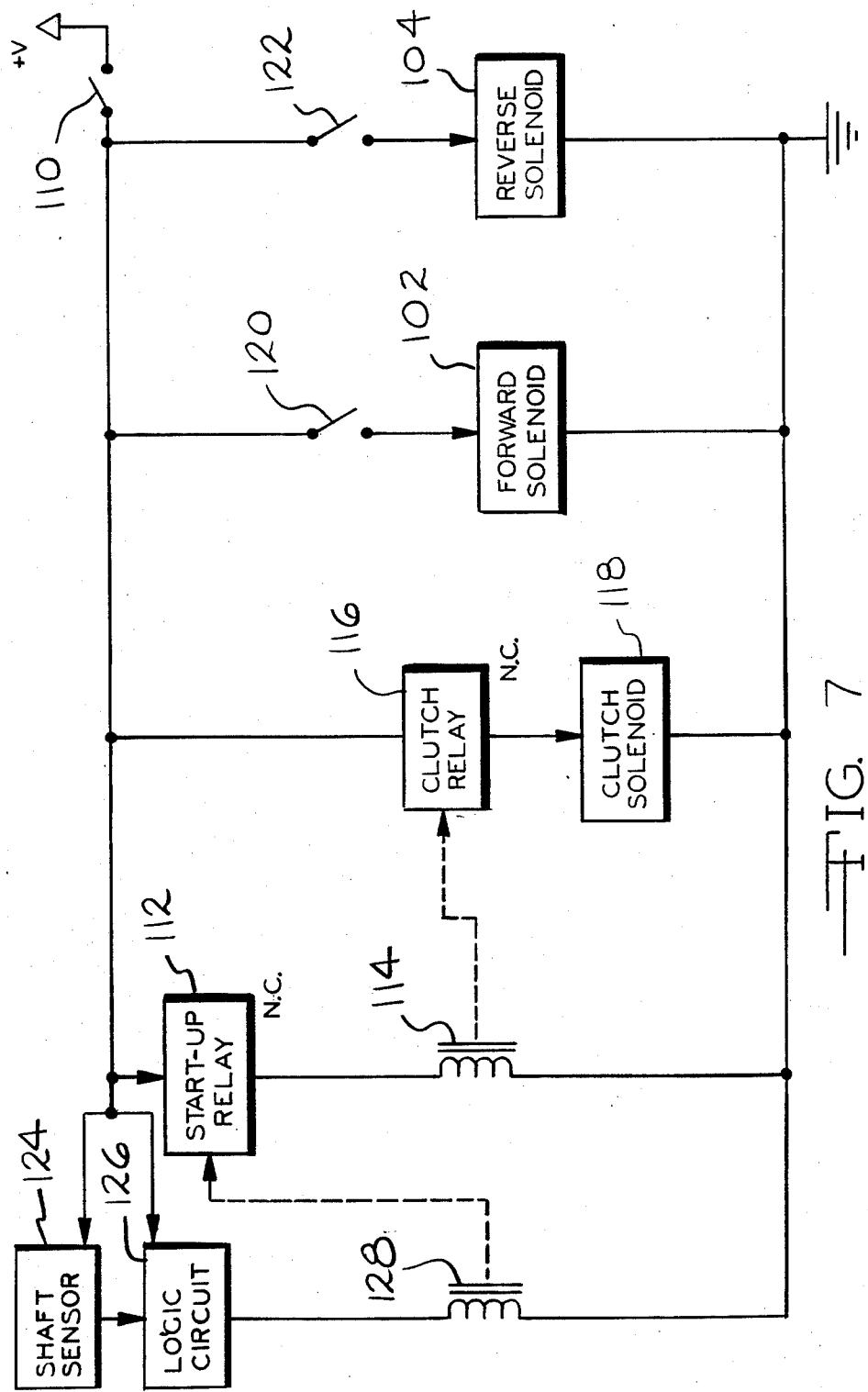
FIG. 7 is a schematic diagram of the electrical control system of the biasing means illustrated in FIGS. 2 and 3.
Figure 8:
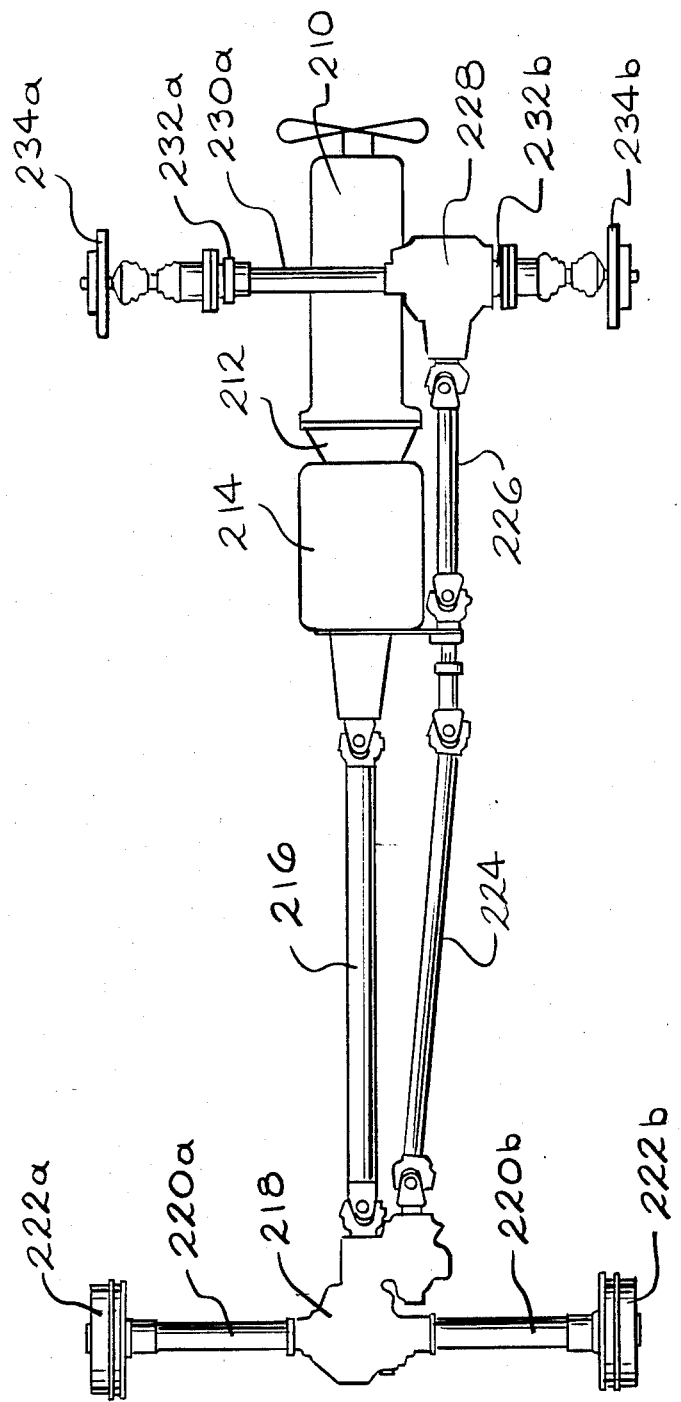
FIG. 8 is a schematic top plan view of a second embodiment of a four wheel drive system for a vehicle in accordance with the present invention.

Referring now to FIG. 7, the electrical circuit for controlling the operation of the forward solenoid 102 and the reverse solenoid 104 is illustrated. The circuit is energized upon the closing of a switch 110 by the operator of the vehicle when it is desired to drive in the four wheel drive mode. When the switch 110 is closed, the circuit is connected to a source of electrical power, such as the battery of the vehicle, and such power is supplied through a normally closed start-up relay 112 to the activating coil 114 of a normally closed clutch relay 116. The energization of the activating coil 114 opens the clutch relay 116 so as to prevent power from passing therethrough to a clutch solenoid 118. The clutch solenoid 118 controls the engagement and disengagement of the clutch device 26. When it is energized, the clutch solenoid 118 engages the clutch device 26 so that the vehicle will be operated in the four wheel drive mode. When it is de-energized, the clutch solenoid 118 disengages the clutch device 26 so that the vehicle will be operated in the two wheel drive mode.

A forward switch 120 and a reverse switch 122 are respectively connected between the forward and reverse solenoids 102 and 104 and the electrical power source. The forward and reverse switches 120 and 122 may be formed as part of the gear shift mechanism (not shown) of the transmission 14 of the vehicle. The forward switch 120 is closed when the vehicle is shifted into a forward gear, while the reverse switch 122 is closed when the vehicle is shifted into a reverse gear. When either of the forward or reverse switches 120 or 122 is closed, the corresponding forward or reverse solenoid 102 or 104 will be energized to move the forward or reverse vacuum valves 98 and 100, respectively, as described above. Thus, the front drive axles 32a and 32b will be automatically biased in the proper direction by the rack actuator 66 whenever the vehicle is shifted into a forward or reverse gear.

A shaft sensor 124 is disposed in the vicinity of the front drive axles 32a and 32b. The shaft sensor 124 is conventional in the art and is adapted to generate a signal representing the direction and amount of rotation of the front drive axles 32a and 32b. A logic circuit 126 receives the signals from the shaft sensor 124. When a predetermined direction and amount of rotation of the front drive axle 32a and 32b has been detected, the logic circuit 126 energizes an activating coil 128 of the start-up relay 112. The direction and amount of rotation is predetermined to be the amount required to move the bi-directional overrunning clutches 34a and 34b to their released positions, which will vary depending upon the size and type of such clutches 34a and 34b utilized. For the type of clutch 34b illustrated in FIG. 4, it has been found that seven degrees of rotation of the front drive axle 34b is sufficient to insure that the clutch 34b is moved to its released position. When this has been achieved, the logic circuit 126 energizes the activating coil 128 of the start-up relay 112, causing the relay 112 to open. The activating coil 114 of the clutch relay 116 is thereby de-energized, causing the clutch relay 116 to close. The clutch solenoid 118 is then energized, and the clutch device 26 will be engaged for four wheel drive operation. Accordingly, it can be seen that the present invention provides a means for preventing the clutch device 26 from engaging the secondary drive axles 32a and 32b with the power generation system of the vehicle for four wheel drive operation until after the bi-directional overrunning clutches 34a and 34b have been biased to their released positions.

Several modifications to the above-discussed four wheel drive system are contemplated to be within the scope of the present invention, and their implementation would be within the scope of knowledge of one skilled in this field of art. For one, the vacuum control system illustrated in FIG. 6 could be replaced by a hydraulic or other fluid-control system. Alternatively, a strictly mechanical system could be utilized. For another, the rack 58 could be disposed so as to rotate the output member 72, instead of the front drive axle 32b, when actuated. All that is required is that one of the front drive axle 32b and the output member 72 be rotated or otherwise moved relative to the other. Additionally, as alluded to earlier, the present invention is equally applicable to vehicles wherein the front drive wheels 36a and 36b comprise the primary drive wheels of the vehicle, with the overrunning clutches 34a and 34b transferred to the rear axles, which then become the secondary drive axles. Other modifications are similarly considered to fall within the scope of the claims appended hereto.

Referring now to FIGS. 8 through 11, there is illustrated a second embodiment of the present invention. An engine 210 of the vehicle is connected through a clutch 212 and a transmission 214 to one end of a first drive shaft 216. The engine 210, clutch 212, and transmission 214 comprise the power generation system of the vehicle. The other end of the first drive shaft 216 is connected to the input of a first carrier assembly 218. The first carrier assembly 218 is provided for transmitting power from the engine 210 to a pair of rear primary drive axles 220a and 220b. Respective primary drive wheels 222a and 222b are connected for rotation with the rear drive axles 220a and 220b. The structure of the first carrier assembly 218 is illustrated in detail in FIG. 9.

The output of the first carrier assembly 218 is connected to one end of a second drive shaft 224. The other end of the second drive shaft 224 is connected for rotation through a second drive shaft extension 226 to the input of a second carrier assembly 228. The second carrier assembly 228 is adapted to transmit power from the second drive shaft 226 to a pair of front secondary drive axles 230a and 230b (only one of the front drive axles 230a is illustrated). The second carrier assembly 228 is identical to the second carrier assembly 30 described above in connection with the first embodiment of the present invention, except that the biasing gear 48, the rack 58, and the vacuum actuator 66 are omitted. Respective bi-directional overrunning clutches 232a and 232b are connected between the front drive axles 230a and 230b and respective secondary drive wheels 234a and 234b. The structure and operation of the bi-directional overrunning clutches 232a and 232b are identical to those clutches 34a and 34b described above and illustrated in FIG. 4.

Figure 9:
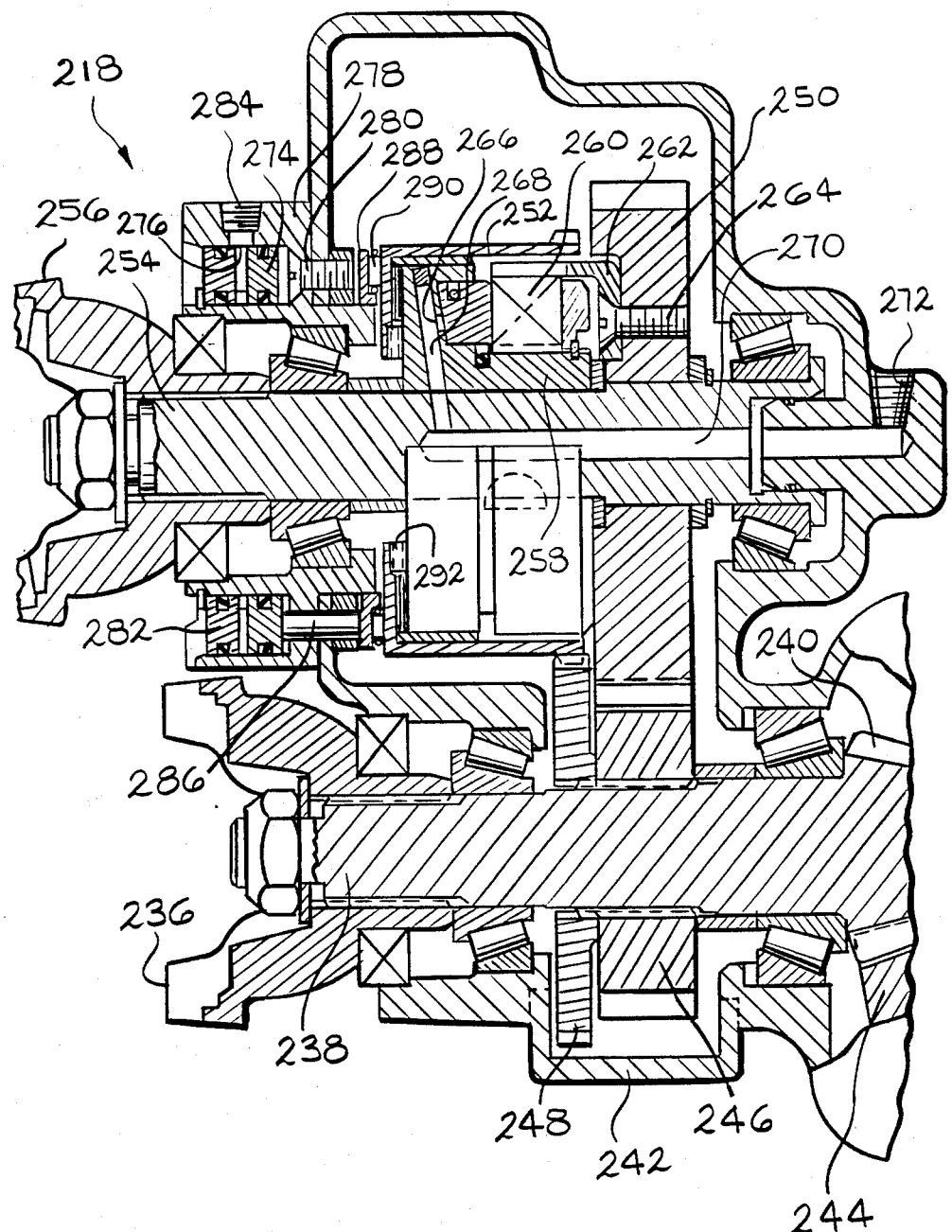
FIG. 9 is an enlarged top plan view, partially in section, of the first carrier assembly illustrated in FIG. 8.

Referring now to FIG. 9, the structure of the first carrier assembly 218 is illustrated in detail. A yoke 236 is adapted to be connected in a known manner to the first drive shaft 216 for rotation therewith. The yoke 236 is attached to a rotatable cylindrical input shaft 238 which terminates in a drive pinion 240 within a housing 242 of the first carrier assembly 218. The drive pinion 240 cooperates with a ring gear 244 of a conventional intra-axle differential gear (not shown). The intra-axle differential assembly is conventional in the art and is adapted to transmit power from the engine 210 to the primary drive axles 220a and 220b while permitting relative rotation therebetween. A first drive gear 246 is splined onto the input shaft 238 for rotation therewith. A first biasing gear 248 is also splined onto the input shaft 238 for rotation therewith. The first drive gear 246 and first biasing gear 248 respectively cooperate with a second drive gear 250 and a second biasing gear 252 disposed about a rotatable cylindrical output shaft 254. The second drive gear 250 and the second biasing gear 252 are freely mounted about the output shaft 254 and, consequently, can normally rotate relative thereto. A yoke 256 is attached to the output shaft 254 and is adapted to be connected in a known manner to the second drive shaft 224.

A cylindrical hub 258 is keyed onto the output shaft 254 in a known manner for rotation therewith. A first clutch means is provided for selectively connecting the second drive gear 250 to the hub 258 and, hence, the output shaft 254 for rotation. The first clutch means can comprise any conventional clutch, such as the illustrated hydraulically-actuated, multiple-plate friction clutch 260. A first plurality of friction plates (not shown) are connected to the hub 258, while a second plurality of friction plates (not shown) are connected to a flange 262 attached to the second drive gear 250 by any conventional means, such as one or more threaded fasteners 264. The first and second pluralities of friction plates are arranged in an alternating, normally spaced apart manner. When fluid pressure is applied to the first clutch 260 through a port 266, the first and second pluralities of friction plates will be moved together so as to frictionally engage one another and, therefore, connect the second drive gear 250 to the hub 258 and the output shaft 254 for rotation. The port 266 communicates through a generally radial passageway 268 and a central passageway 270 formed in the output shaft 254 to a first fluid inlet 272 formed in the housing 242.

A second clutch means is provided for selectively connecting the second biasing gear 252 to the hub 258 and, hence, the output shaft 254 for rotation. The second clutch means can also comprise any conventional clutch. In the illustrated embodiment, an annular piston 274 is provided within an annular chamber 276 formed in a cover 278. The cover 278 is attached to the housing 242 by a plurality of threaded fasteners 280. The chamber 276 is closed at one end by a seal 282 and communicates with a second fluid inlet 284 formed in the cover 278. The piston 274 is connected to a plurality of cylindrical rods 286 (only one is illustrated) spaced about the circumference thereof. The rods 286 extend inwardly toward the second biasing gear 252. Between the inward ends of the rod 286 and the second biasing gear 252, a thrust washer 288 and a thrust bearing 290 are disposed.

When fluid pressure is applied through fluid inlet 284 to the chamber 276, the piston 274 and the rods 282 will be moved inwardly toward the second biasing gear 252. The ends of the rods 286 will engage and move the thrust washer 288 so as to exert a force inwardly against the thrust bearing 290 and the second biasing gear 252. In response thereto, the second biasing gear 252 will also move inwardly and frictionally engage a surface of the hub 258. Thus, the second biasing gear 252 will be connected to the hub 258 for rotation with the output shaft 254. When the fluid pressure in the chamber 276 is removed, a wave spring 292, provided between the second biasing gear 252 and the hub 258, will move the second biasing gear 252 out of frictional engagement with the hub 258.

In operation, both the first and second clutch means are disengaged when the vehicle is operated in the two wheel drive mode. In this mode, the output shaft 254 is connected to neither the second drive gear 250 nor the second biasing gear 252. Hence, there is no connection between the output shaft 254 and the power generation system of the vehicle, and the secondary drive wheels 234a and 234b can rotate freely. When the vehicle is operated in the four wheel drive mode, the first clutch means is engaged so as to connect the second drive gear 250 to the output shaft 254. As shown in FIG. 9, the first drive gear 246 is smaller than the second drive gear 250. As a result, the output shaft 254 will be driven at a speed which is somewhat slower than the input shaft 238 when the first clutch means is engaged. Such an arrangement is desirable, as previously mentioned, to insure that the front drive axles 230a and 230b overrun the rear drive axles 220a and 220b when the vehicle is operated on a non-slippery surface.

In contrast, however, the first biasing gear 248 is larger than the second biasing gear 252. When the second clutch means is engaged, the output shaft 254 will be driven at a speed which is somewhat faster than the input shaft 238. As a result, the *rear* drive axles 220a and 220b are driven slower than the *front* drive axles 230a and 230b. This condition is desirable because the bi-directional overrunning clutches 232a and 232b on the front drive axles 230a and 230b, respectively, will automatically be moved to their released positions if the direction of the vehicle has been changed from forward to reverse or reverse to forward. This effectively avoids the above-identified lock-up problem associated with the use of the bi-directional overrunning clutches 232a and 232b in conventional four wheel drive systems. Because it is undesirable, for obvious reasons, to constantly drive the front drive axles 230a and 230b faster than the rear drive axles 220a and 220b, the second clutch means is initially engaged each time the vehicle transmission 214 is shifted into a forward or reverse gear only until the bi-directional clutches 232a and 232b are biased to their released positions, when this occurs, the second clutch means is disengaged (releasing the second biasing gear 252 from the output shaft 254) and the first clutch means is engaged (connecting the second drive gear 250 to the output shaft 254) for normal four wheel drive operation. The means for accomplishing this sequence includes a hydraulic control system for actuating the first and second clutch means and an electrical control system to regulate the operation of the hydraulic control system.

Figure 10:
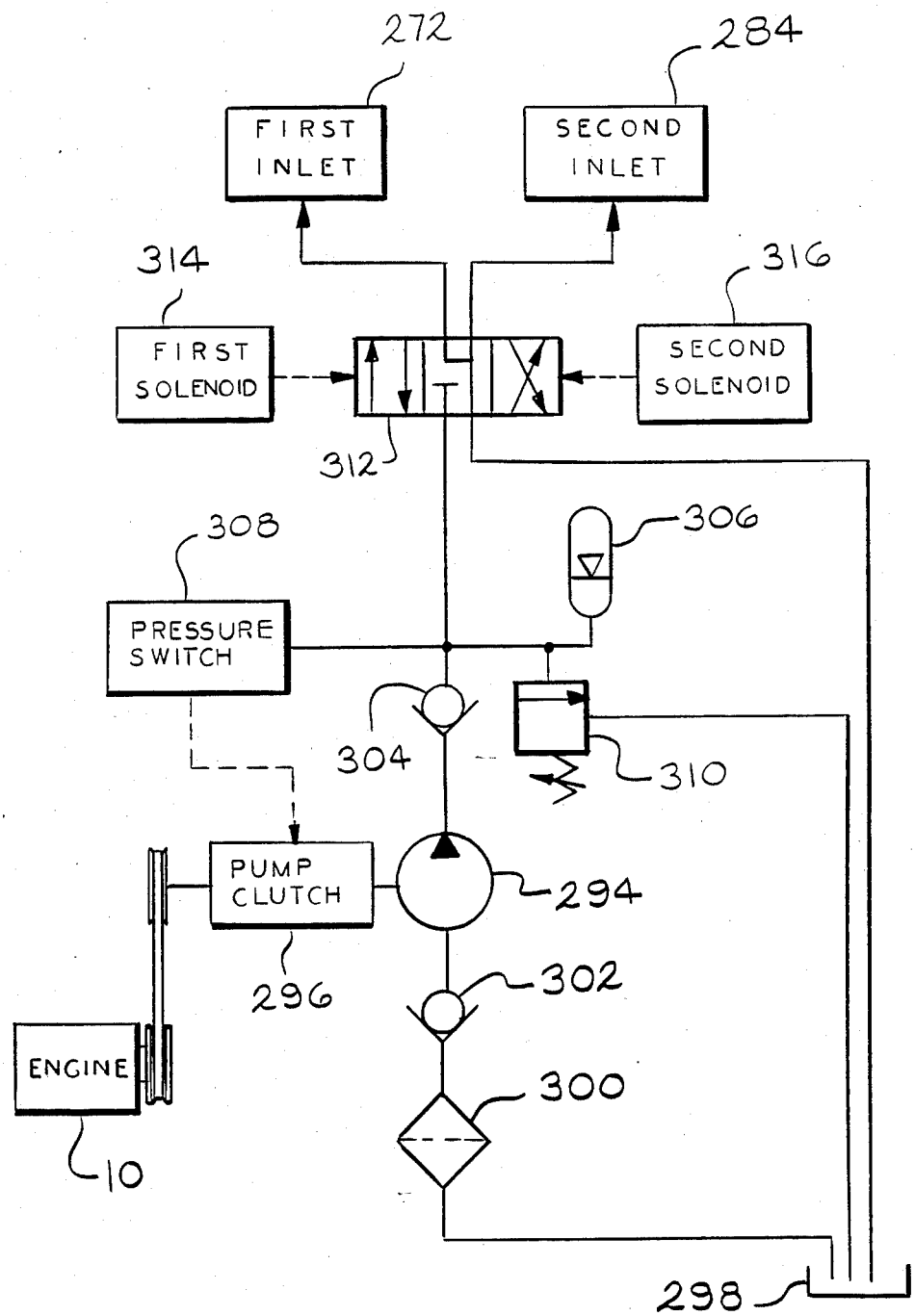
FIG. 10 is a schematic diagram of the hydraulic control system of the biasing means illustrated in FIG. 9.

Referring now to FIG. 10, the hydraulic control system of the biasing means of the present invention is illustrated. A hydraulic pump 294 is connected to the engine 10 of the vehicle through a pump clutch 296. As will be described in greater detail below, the pump clutch 296 is provided to selectively disengage the hydraulic pump 294 from the engine 10. When engaged, the hydraulic pump 294 pumps fluid from a reservoir 298 through a sump strainer 300, a first one-way check valve 302, and a second one-way check valve 304 into an accumulator 306. The fluid pressure in the accumulator 306 can increase up to a first predetermined level, at which time a pressure switch 308 is activated to de-energize the pump clutch 296 so as to disengage the hydraulic pump 294 from the engine 10. Thus, the fluid pressure in the accumulator 306 should normally not exceed a first predetermined level. If, for some reason, the fluid pressure in the accumulator 306 should continue to rise above the first predetermined level, a pressure release valve 310 is provided to bleed off excess fluid pressure above a second predetermined level, greater than the first predetermined level, and return the fluid to the reservoir 298.

The accumulator 306 is also connected through a three-position valve 312 to the first and second fluid inlets 272 and 284 of the second carrier assembly 218. In its normal de-energized condition illustrated in FIG. 10, the input to the valve 312 from the accumulator 306 is blocked such that no fluid pressure is transmitted therethrough to either of the inlets 272 and 284. At the same time, both of the inlets 272 and 284 are vented through the valve 312 to the reservoir 298 in order to remove any residual fluid pressure therein. A first solenoid 314 is provided for moving the valve 312 to a second position (toward the right when viewing FIG. 10) when the first solenoid 314 is energized. When the valve 312 is in the second position, the accumulator 306 is connected to the first inlet 272, while the second inlet 284 is vented to the reservoir 298. When this occurs, the first clutch means will be engaged so as to connect the second drive to the output shaft 254 for rotation therewith, as described above. Similarly, a second solenoid 316 is provided for moving the valve 312 to a third position (toward the left when viewing FIG. 10) when the second solenoid 316 is energized. When the valve 312 is in the third position, the accumulator 306 is connected to the second inlet 284, while the first inlet 272 is vented to the reservoir 298. When this occurs, the second clutch means will be engaged so as to connect the second biasing gear 252 to the output shaft 254 for rotation therewith, as described above.

Figure 11:
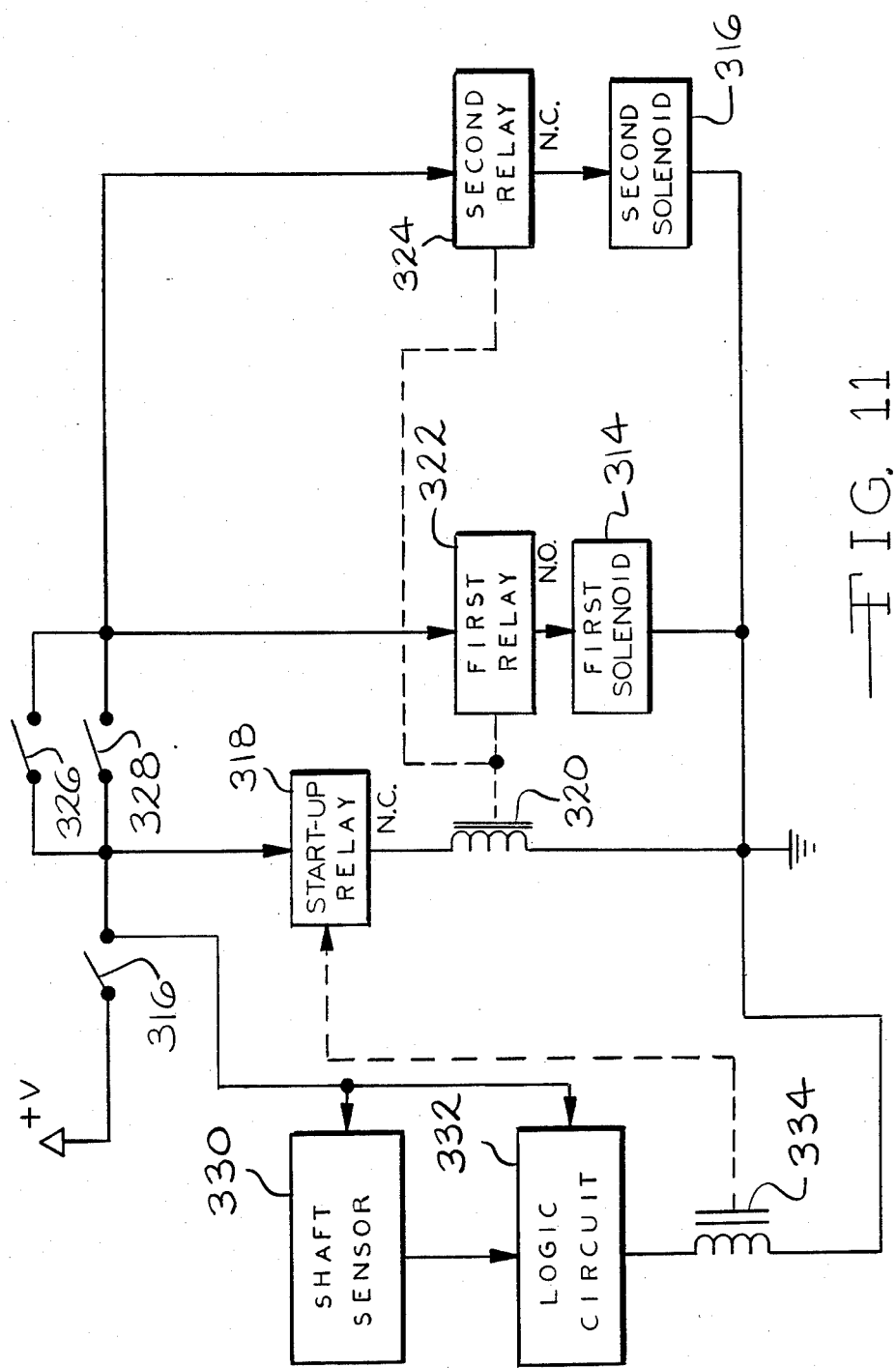
FIG. 11 is a schematic diagram of the electrical control system of the biasing means illustrated in FIG. 9.

Referring to FIG. 11, the electrical circuit for controlling the operation of the first solenoid 314 and the second solenoid 316 is illustrated. The circuit is energized upon the closing of a switch 316 by the operator of the vehicle when it is desired to drive in the four wheel drive mode. When the switch 316 is closed, the circuit is connected to a source of electrical power, such as the battery of the vehicle, and such power is supplied through a normally closed start-up relay 318 to the activating coil 320 of both a normally closed first relay 322 and a normally open second relay 324. The energization of the activating coil 320 opens the first relay 322 and closes the second relay 324. The forward switch 326 and a reverse switch 328 are connected in parallel between the switch 316 and the first and second relays 322 and 324. The forward and reverse switches 326 and 328 can operate in the same manner as the forward and reverse switches 120 and 122, respectively, described above in connection with the first embodiment of the invention. When either the forward switch 326 or the reverse switch 328 is closed, power is supplied therethrough to both the first relay 322 and the second relay 324. Since both of those relays 322 and 324 have been energized out of their normal condition (by virtue of the closing of the switch 316), the first solenoid 314 will be de-energized and the second solenoid 316 will be energized when either of the switches 326 and 328 are closed. As a result, the second solenoid 316 will move the valve 312 to its third position, whereby the second inlet 284 is connected to the accumulator 306 and the first inlet 272 is vented to the reservoir 298. In response thereto, the second clutch means will connect the second biasing gear 252 to the output shaft 254 for rotation therewith. As described above, movement of the vehicle in this mode will cause the bi-directional overrunning clutches 232a and 232b to be moved to their released position.

A shaft sensor 330 is disposed in the vicinity of the front drive axle 230a and 230b. The shaft sensor 330 is conventional in the art and is adapted to generate a signal representing the direction and amount of rotation of the front drive axles 230a and 230b. A logic circuit 332 receives the signals from the shaft sensor 330. When a predetermined direction and amount of rotation of the front drive axles 230a and 230b have been detected, the logic circuit 332 energizes an activating coil 334 of the start-up relay 318. As with the first embodiment of the invention, the direct and amount of rotation required to move the bi-directional overrunning clutches 232a and 232b to their released positions will vary depending upon the size and the type of such clutches 232a and 232b utilized. When that amount of rotation has been achieved, the logic circuit 332 energizes the activating coil 334, causing the start-up relay 318 to open. The activating coil 320 of the first relay 322 and the second relay 324 is then de-energized. As a result, the first relay 322 will close, thereby energizing the first solenoid 314, and the second relay 324 will open, thereby de-energizing the second solenoid 316. The valve 312 will then be moved to its second position, wherein the first inlet 272 is connected to the accumulator 306 and the second inlet 284 is vented to the reservoir 298. As described above, the second clutch means will then disconnect the second biasing gear 252 from the output shaft 254, while the first clutch means will then connect the second drive gear 50 to the output shaft 254. In this mode, the vehicle is prepared for normal four-wheel drive operation. Accordingly, it can be seen that the present invention provides a means for preventing the second clutch means from engaging the output shaft 254 with the power generation system of the vehicle for four-wheel drive operation until after the bi-directional overrunning clutches 232a and 232b have been biased to their released positions.

As mentioned above, several modifications to the above-discussed four-wheel drive system are contemplated to be within the scope of the present invention, and their implementation would be within the scope of knowledge of one skilled in this field of art. In accordance with the provisions of the patent statutes, however, the principle and mode of operation of the present invention have been explained and illustrated in its preferred embodiments. It must be appreciated that the present invention can be practiced otherwise than as specifically explained and illustrated without departing from its spirit or scope.

What is claimed is:

1. A four wheel drive system for a vehicle having a power generation system comprising:

a first carrier assembly connected to the power generation system of the vehicle and adapted to transmit power to a first pair of drive wheels;

a second carrier assembly having an input member selectively connected through a clutch means to an output member, said output member being connected to a second pair of drive wheels, said second carrier assembly being adapted to selectively transmit power from said input member to said output member;

means for selectively connecting said first carrier assembly to said input member of said second carrier assembly for transmitting power thereto; and means for biasing one of said input and output members relative to the other of said input and output members prior to engaging said means for selectively connecting said first carrier assembly to said input member of said second carrier assembly.

2. The invention defined in claim 1 wherein said means for selectively connecting said first carrier assembly to said input member of said seconad carrier assembly includes a drive gear means disposed within said first carrier assembly and continuously connected to the power generation system for rotation therewith and a first clutch means for selectively connecting said drive means to said input member of said second carrier assembly.

3. The invention defined in claim 2 wherein said means for biasing includes a biasing gear means disposed within said first carrier assembly and continuously connected to the power generation system for rotation therewith and a second clutch for selectively connecting said biasing gear means to said input member of said second carrier assembly.

4. The invention defined in claim 1 wherein said means for selectively connecting said first carrier assembly to said input member of said second carrier assembly includes a clutch means connected between an output member of said first carrier assembly and said input member of said second carrier assembly.

5. The invention defined in claim 4 wherein said means for biasing includes a means for moving one of said input and output members of said second carrier assembly relative to the other of said input and output members of said second carrier assembly, and further includes a means for perventing said clutch means from connecting said output member of said first carrier assembly to said input member of said second carrier assembly until said means for biasing moves one of said input and output members of said second carrier assembly relative to the other.

6. A four wheel drive system for a vehicle having a rotational power generation system comprising:
a first carrier assembly connected to the power generation system of the vehicle and adapted to transmit rotational power to a first pair of drive wheels;
a second carrier assembly having an input member selectively connected through an overrunning clutch means to an output member, said output member being connected to a second pair of drive wheels, said second carrier assembly being adapted to selectively transmit rotational power from said input member to said output member;
clutch means for selectively connecting said first carrier assembly to said input member for transmitting power thereto; and
means for rotating said input member relative to said output member prior to engaging said clutch means to connect said first carrier assembly to said input member.

7. The invention defined in claim 6 wherein said means for rotating said input member includes a biasing gear connected to said input member and a movable rack adapted to engage and rotate said biasing gear when moved.

8. The invention defined in claim 7 further including means for moving said rack in either of two linear directions.

9. The invention defined in claim 8 wherein said means for moving said rack includes a vacuum actuator.

10. The invention defined in claim 8 wherein said means for moving said rack includes a hydraulic actuator.

11. The invention defined in claim 8 further including means for preventing said clutch means from connecting said first carrier assembly to said input member until said rack has been moved so as to rotate said input member relative to said output member.

12. The invention defined in claim 11 wherein said means for preventing said clutch means from connecting said first carrier assembly to said input member includes a shaft sensor adapted to generate signals representing movement of said input member and logic circuit means responsive to said signals for de-energizing said clutch means to prevent connection of said first carrier assembly to said input member until a predetermined amount of rotation of said input member has been detected.

13. A four wheel drive system for a vehicle having a rotational power generation system comprising:
a first carrier assembly connected to the power generation system of the vehicle and adapted to transmit rotational power to a first pair of drive wheels;
a second carrier assembly including an overrunning clutch means having an input member and an output member connected to a second pair of drive wheels, said second carrier assembly adapted to transmit rotational power from said input member to said output member;
first drive gear means connected to said first carrier assembly for rotation therewith;
second drive gear means mounted about said input member and rotatable thereabout, said second drive gear means being connected to said first drive gear means for rotation therewith;
first biasing gear means connected to said first carrier assembly for rotation therewith;
second biasing gear means mounted about said input member and rotatable thereabout, said second biasing gear means being connected to said first biasing gear means for rotation therewith; and
means for connecting said second biasing gear to said input member to rotate said input member relative to said output member prior to connecting said second drive gear to said input member for four wheel drive operation.

14. The invention defined in claim 13 wherein said first and second drive gear means are sized such that said second pair of drive wheels are driven at a speed which is slower than the speed at which said first pair of drive wheels are driven when said second drive gear is connected to said input member for rotation therewith.

15. The invention defined in claim 13 wherein said first and second biasing gear means are sized such that said second pair of drive wheels are driven at a speed which is faster than the speed at which said first pair of drive wheels are driven when said second biasing gear means is connected to said input member for rotation therewith.

16. The invention defined in claim 13 wherein said means for connecting includes a first clutch means for selectively connecting said second drive gear means to said input member, a second clutch means for selectively connecting said second biasing gear to said input member, and means for preventing said first clutch means from connecting said second drive gear means to said input member until said second clutch means, has, connected said second biasing gear to said input member.

17. The invention defined in claim 13 wherein said means for connecting includes a first clutch means for selectively connecting said second drive gear means to said input member, a second clutch means for selectively connecting said second biasing gear to said input member, and means for preventing said first clutch means from connecting said second drive gear means to said input member until said input member has been rotated relative to said output member.

18. The invention defined in claim 17 wherein said means for preventing said first clutch means from connecting said second drive gear means to said input member includes a shaft sensor adapted to generate signals representing movement of said input member and logic circuit means responsive to said signal for selectively energizing and de-energizing said first and second clutch means to prevent said first clutch means from cnnecting said drive gear means to said input member until said input member has been rotated relative to said output member by a predetermined amount.

* * * * *